Dec. 11, 1934.   E. LAUGAUDIN   1,984,144
PNEUMATIC SHOCK ABSORBER
Filed Feb. 7, 1933
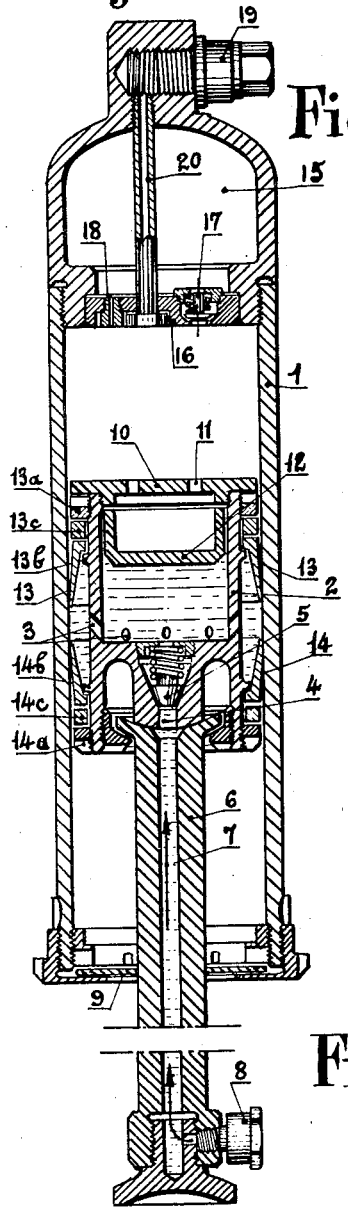
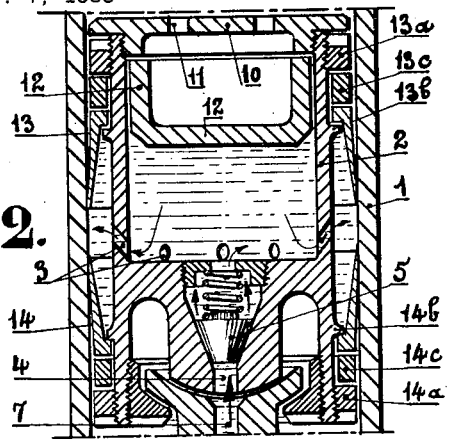
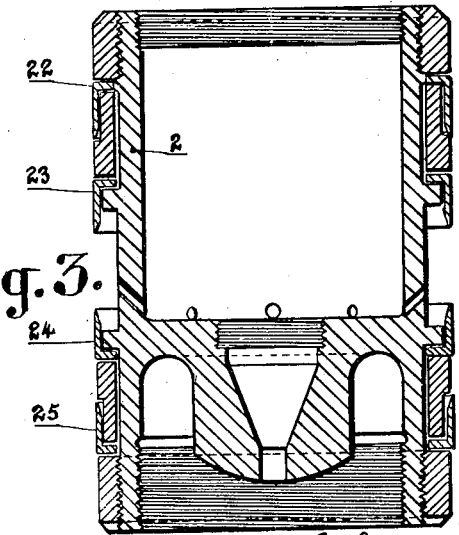
INVENTOR:
E. Laugaudin
By Marks & Clerk Patented Dec. 11, 1934

1,984,144

UNITED STATES PATENT OFFICE 1,984,144

PNEUMATIC SHOCK ABSORBER

Eugène Laugaudin, Gentilly, France

Application February 7, 1933, Serial No. 655,662
In France September 26, 1932

5 Claims. (Cl. 267—65)

The present invention relates to improvements in pneumatic suspension systems for land or aerial vehicles, wherein the compressed air enclosed in a cylinder is further compressed by a piston moving in this cylinder under the action of the impacts transmitted to it.

This invention relates to an improved device of this kind of pneumatic suspension system which comprises an absolutely fluid tight liquid joint between the cylinder and the piston, while a so-called compensating chamber is formed at the head of the cylinder for preventing hammer blows.

In this suspension device the piston, which, under the action of the impacts transmitted to it, further compresses air in the cylinder in which it moves, comprises a driven piston having a hollow head in which can move a loose piston. A fluid tight seal between the driven piston and the cylinder is formed by a liquid imprisoned between the loose piston and the driven piston. This liquid fluid, under the action of the pressure transmitted to it by the loose piston, passes through apertures formed in the hollow head of the driven piston, and forms between the driven piston and the cylinder a liquid segment which is itself imprisoned to some extent between two opposed cups preferably made of an elastic metal which, as a result of the pressure exerted upon the fluid, press closely against the walls of the cylinder.

Further, in this device a compensating chamber is placed at the head of the cylinder, and communicates with it through apertures permitting the storage in this chamber of the air, highly compressed in the cylinder by the movement of the piston under the action of impacts, and only permitting this air to return into the cylinder slowly so as to prevent return shocks.

The whole suspension device will hereinafter be called a "bottle".

This device is shown by way of example in the accompanying drawing, in which:

Figure 1 is a vertical section of the assembled bottle.

Figure 2 shows to a larger scale the piston arrangement contained in Figure 1.

Figure 3 is a sectional view of the modification of the invention.

As will be seen in the drawing, this bottle is formed by a cylinder 1 in which is mounted the piston. The piston head is formed by a hollow chamber 2. This chamber comprises on its periphery and at its lower part a series of apertures 3, and at its centre a duct 4 closed by a valve 5.

The connecting rod 6 of the piston is provided with a central duct 7 extending the duct 4. It is closed at its lower part by a plug 8, of the lubricating box type. The operating rod 6 is connected to the piston by a ball mounting, in order to permit a certain displacement to occur between the shaft and the piston. A slotted guide 9 situated at the base of the cylinder 1 prevents excessive displacements of the said rod 6.

The chamber 2 of the piston is formed by a plate 10 provided with a suitable number of apertures 11 of suitable size. In the head of the piston thus formed is mounted a loose piston 12, preferably cup-shaped, adapted to move in the chamber 2 the inner wall of which forms a cylinder for this loose piston.

Around the piston thus formed are mounted two opposed cups 13 and 14, made of any suitable material and preferably of an elastic metal. These cups are intended to cooperate with the fluid in order to provide a perfect joint with the cylinder 1, as will be explained hereinafter.

These cups 13 and 14 are clamped respectively by nuts 13a and 14a between shoulders 13b and 14b, provided on the piston, and rings 13c and 14c. These rings are adapted to provide a guiding surface in the cylinder, as this guiding surface cannot be obtained effectively by the cups 13 and 14 which are elastic. Upon the upper part of the cylinder 1 is screwed a chamber 15, the lower part of which comprises a base 16 secured in any suitable manner to the said chamber.

A valve 17 of any type is mounted upon this base which is also provided with a duct of small size 18 putting the chamber 15 into communication with the cylinder 1.

The head of this chamber comprises a closing plug 19 which permits compressed air to be supplied to the cylinder 1 through the pipe 20 traversing the base 16 and leading into the cylinder.

The operation of this device is as follows: the fluid intended to provide the joint between the piston and the cylinder is injected through the plug 8. This fluid will for example be oil. This oil passes through the duct 7, then through the duct 4, raises the valve 5 and spreads in the chamber 2, while pushing the loose piston 12 to the extreme end of its travel.

This oil passing through the ducts 3 spreads in the space comprised between the cups 13 and 14.

Air under pressure is supplied through the plug 19 and the pipe 20 into the upper part of the cylinder. This air also passes through the valve 17 and the small duct 18 into the compensating chamber 15.

The bottle thus constructed operates in the following manner: Under the action of impacts transmitted to the rod 6, the piston moves in the cylinder 1 and further compresses the compressed air contained therein. This compressed air passes through the valve 17 and the small duct 18 into the compensating chamber 15. A pressure is established therein which is substantially equal to the pressure existing in the cylinder 1. When the piston returns, the compressed air in the upper part of the cylinder 1 expands and the compressed air in the chamber 15, which is at this moment at a higher pressure than that contained in the cylinder 1, passes relatively slowly through the duct 18 which, as indicated above, is of small cross section. The air cannot pass through the valve 17 which is pressed on its seat by the greater pressure existing in the chamber 15 so that the return of the piston is damped, thus preventing return shocks.

The pressure existing in the cylinder 1 is transmitted by the piston 12 to the fluid comprised between the elastic cups 13 and 14. This has the following effects:

1. It presses the cups 13 and 14 closely against the wall of the cylinder, thus preventing oil from escaping and also providing a first fluid tight seal which is obtained by the cups 13 and 14 themselves.

2. It gives a perfectly fluid tight seal preventing the passage of air. It will in fact be understood that, as a result of the pressure exerted upon it, the fluid is pressed strongly against the wall of the cylinder and follows the contour of even the smallest irregularities that may exist on the wall.

If after long use the quantity of oil producing the joint is reduced, it will be sufficient to introduce the necessary quantity through the plug 8.

Finally, in the embodiment shown in Figure 3 (which only comprises the piston head without its external members), four cups, 22, 23, 24 and 25, are employed instead of the two elastic cups shown in Figure 1.

The bottle thus formed with its compensating chamber gives an exceptionally smooth suspension. The joint formed by the oil and the cups is absolutely fluid tight.

It is clearly understood that the shapes, dimensions materials employed and constructional details are only given by way of example, and may vary without on that account going outside the scope of the invention.

What I claim is:

1. A pneumatic shock absorber comprising a cylinder having a closed end, a compensating chamber on said closed end, a leak connection between the said chamber and the cylinder, a duct connection between the chamber and the cylinder and a one way valve on this duct openable towards the chamber, a duct traversing the compensating chamber and having one end adapted for connection to a compressed air supply and leading at its other end into the cylinder, a hollow main piston movable in the said cylinder with peripheral clearance, sealing means such as opposed flexible cup washers spacedly arranged on said piston, whereby an annular chamber is formed between the said piston and the cylinder, the said piston having perforations in its peripheral walls whereby a communication is established between the interior of the said piston and the said annular chamber, the said piston having one closed end connectible to a piston rod and one open end nearer the closed end of the cylinder, and having a duct in the said closed end for connection to a supply of liquid, and a one way valve on this duct openable towards the piston, a perforated plate mounted on the open end of the said piston and a second piston freely movable within the said hollow main piston and adapted to separate a mass of liquid contained in the said hollow piston and a mass of compressed air contained in the cylinder.

2. A pneumatic shock absorber, comprising a cylinder, a hollow main piston movable in this cylinder with peripheral clearance, and opposed flexible cup washers, each formed by an annular ring having a tapering skirt, spacedly arranged on said hollow piston whereby an annular chamber is formed between the said piston and the said cylinder, the said main piston having perforations in its peripheral walls situated between said washers, a perforated plate mounted on the end of said main piston, a second piston freely movable in the hollow main piston and adapted to separate a mass of liquid contained in the said hollow piston and a mass of compressed air contained in the cylinder.

3. A pneumatic shock absorber comprising a cylinder, a hollow main piston movable in this cylinder with peripheral clearance, shoulders spacedly arranged on the outer surface of said piston, rings adjustably mounted on the piston and opposed flexible cup washers, each formed by an annular ring having a tapering skirt mounted on the piston, between the said shoulders and the said rings, whereby an annular chamber is formed between the said piston and the said cylinder, the said main piston having perforations in its peripheral walls situated between said washers, a perforated plate mounted on the end of said main piston, a second piston freely movable in the hollow main piston and adapted to separate a mass of liquid contained in the said hollow piston and a mass of compressed air contained in the cylinder.

4. A pneumatic shock absorber comprising a cylinder having a closed end, a compensating chamber on said closed end, a leak connection between the said chamber and the cylinder, a duct connection between the chamber and the cylinder and a one way valve on this duct openable towards the chamber, a duct traversing the compensating chamber and having one end adapted for connection to a compressed air supply and leading at its other end into the cylinder, a hollow main piston movable in the said cylinder with peripheral clearance, opposed flexible cup washers, each formed by an annular ring having a tapering skirt, spacedly arranged on said piston, whereby an annular chamber is formed between the said piston and the cylinder, the said piston having perforations in its peripheral walls whereby a communication is established between the interior of the said piston and the said annular chamber, the said piston having one closed end connectible to a piston rod and one open end nearer the closed end of the cylinder and having a duct in the said closed end for connection to a supply of liquid, and a one way valve on this duct openable towards the piston, a perforated plate mounted on the open end of the said piston and a second piston freely movable within the said hollow main piston and adapted to separate a mass of liquid contained in the said hollow piston and a mass of compressed air contained in the cylinder.

5. A pneumatic shock absorber comprising a cylinder having a closed end, a compensating chamber on said closed end, a leak connection between the said chamber and the cylinder, a duct connection between the chamber and the cylinder and a one way valve on the duct openable towards the chamber, a duct traversing the compensating chamber and having one end adapted for connection to a compressed air supply and leading at its other end into the cylinder, a hollow main piston movable in the said cylinder with peripheral clearance, shoulders spacedly arranged on the outer surface of said piston, rings adjustably mounted on the piston and opposed flexible cup washers, each formed by an annular ring having a tapering skirt mounted on said piston, between the said shoulders and the said rings, whereby an annular chamber is formed between the said piston and the cylinder, the said piston having perforations in its peripheral walls whereby a communication is established between the interior of the said piston and the said annular chamber, the said piston having one closed end connectible to a piston rod and one open end nearer the closed end of the cylinder and having a duct in the said closed end for connection to a supply of liquid, and a one way valve on this duct openable towards the piston, a perforated plate mounted on the open end of the said piston and a second piston freely movable within the said hollow main piston and adapted to separate a mass of liquid contained in the said hollow piston and a mass of compressed air contained in the cylinder.

EUGÈNE LAUGAUDIN.